United States Patent
Biradar et al.

(10) Patent No.: US 6,407,797 B1
(45) Date of Patent: Jun. 18, 2002

(54) POLYMER COATED LONG DURATION OPTICAL MEMORY DEVICE AND A METHOD FOR THE DEVELOPMENT THEREOF

(75) Inventors: Ashok M. Biradar; Sukhwant S. Bawa; Ereuvassi P. Haridas; Subhas Chandra, all of New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/433,580

(22) Filed: Nov. 4, 1999

(30) Foreign Application Priority Data

Sep. 16, 1999 (IN) ............................................ 1246/1999

(51) Int. Cl.$^7$ .................................................. G02F 1/13
(52) U.S. Cl. .......................... 349/187; 359/70; 359/77; 428/1
(58) Field of Search ........................... 349/187; 359/77, 359/70; 428/1

(56) References Cited

U.S. PATENT DOCUMENTS

| | | | | |
|---|---|---|---|---|
| 5,085,498 A | * | 2/1992 | Yamamoto et al. | ............ 359/70 |
| 5,313,321 A | * | 5/1994 | Yamamoto et al. | ............ 359/77 |
| 5,523,128 A | * | 6/1996 | Itoh et al. | ....................... 428/1 |

* cited by examiner

Primary Examiner—Kenneth Parker
Assistant Examiner—David Chung
(74) Attorney, Agent, or Firm—Sughrue Mion, PLLC

(57) ABSTRACT

The invention relates to a method for the preparation of a polymer coated long duration optical memory device having applications in ferroelectric liquid crystal materials, the said method comprising the steps of forming patterns of different shapes and configurations on a glass substrate coated with indium tin oxide by lithographic methods to obtain an effective electrode area of at least 5 mm$^2$; depositing an antireflection coating on external surfaces of glass substrates followed by coating the patterned glass substrate with a polymer selected from the polyamide group of nylon 6/6 and nylon 6/9 in the thickness range of 900 Å–1100 Å; baking the coated substrate followed by hard rubbing of the polymer coated surface; coating one of the substrates with a spacer selected from photoresist having thickness in the range of 1 $\mu$m to 3 $\mu$m; inserting a ferroelectric liquid crystal material in the space between the coated glass substrates, followed by sealing the sandwiched glass substrates at the periphery; heating and cooling the sandwiched glass substrates; fixing a polariser and an analyser on non conducting surface of each of the respective glass plates, followed by application of electric field across the sandwiched substrates for achieving the stable memory action, by applying an AC and DC field across the device to obtain an optical memory device having a long duration of memory at least one year.

21 Claims, No Drawings

POLYMER COATED LONG DURATION OPTICAL MEMORY DEVICE AND A METHOD FOR THE DEVELOPMENT THEREOF

FIELD

The present invention relates to a method for manufacturing a polymer coated long duration optical memory device having applications in ferroelectric liquid crystal materials.

BACKGROUND

Ferroelectric liquid crystal devices (FLCD) are widely used in spatial light modulators, light shutters, optical interconnects, optical switches, optical gates for optical computing, high definition television terminals, electro-optic modulators etc. The optical addressed spatial light modulators has a great interest due to their applications in optical data processing, image amplification, incoherent to coherent image converters, wavelength converters, optical correlators etc. The surface bistability in ferroelectric liquid crystal materials in which the thickness of the cell is smaller than the pitch value of material, has a great potential from the application point of view. The fast switching bistable electro-optic devices based on ferroelectric liquid crystal material comprises a well aligned thin (1–3 $\mu$m) layer of FLC sandwiched between two optically flat polished glass plates having transparent electrically conducting electrode patterns thereon. The two glass plates, are peripherically sealed and the electrical connections are taken out from the substrates. The display fixed with crossed polarizers on outer faces of both glass plates is connected with very large scale integrated (VLSI) electronic modules to be used as an information display for displaying electrical or optical data.

At present ferroelectric liquid crystal displays or devices are being prepared by 1. shearing the plates just below the smectic A–smectic C* (Sm C*–Sm A) transition temperature
2. by applying magnetic field
3. temperature gradient from spacer edge
4. depositing thin films of silicon monoxide on the supporting substrates with oblique angle of evaporation
5. polymer treated rubbed plates and
6. post treating the zig-zag defected sample with an ac voltage of 20 Vpp for few hours.

PRIOR ART

It is known in the state of the art that FLCD's are being prepared by shearing the two glass plates at a temperature just below the Sm A–Sm C* phase transition. Smectic layers get aligned by applying shear and that layer structure is retained in Sm C* phase of liquid crystal to get an uniform defect free alignment of ferroelectric liquid crystals, reference may be made to N. A. Clark & S. T. Lagerwall, U.S. Pat. No. 4,563,059; N. A. Clark, and S. T. Lagerwall, Appl.Phys Lett, Vol.36, 899 (1980). The drawback of shearing technique is to get an uniform alignment over a large area because of the difficulty in applying uniform shear and to maintain a uniform temperature through out the display. The technique thus cannot be used as a commercially viable one.

It is also known in the state of art that the FLCD can be prepared by aligning the FLC molecules by magnetic field. Ferroelectric liquid crystal film encapsulated between transparent conducting glass plates is cooled slowly to Sm C* phase from its isotropic phase in strong uniform magnetic field. Reference may be made to A. M. Biradar, S. Wrobel and W. Haase, as described in Phys.Rev. A Vol. 39, 2693 (1989). The drawback in this process is to get uniform magnetic field over the large area and it takes long preparation time. Another known process in the state of the art is to grow smectic A phase under a temperature gradient as described by K. Ishikawa et. al; in Jpn. J. Appl. Phys. Vol.23, L211–213, (1984). The nucleation of the smectic A phase is initiated with the aid of spacer edge. The temperature gradient is obtained by using an Indium tin oxide (ITO) electrode properly etched as a local heater. This technique is very cumbersome and the maximum obtainable macro-domain is about one square millimeter in size.

Another process of making an uniform homogeneously aligned display is to deposit thin films of silicon monoxide at a pressure of $1 \times 10^{-5}$ torr, on the supporting transparent conducting glass plates with oblique angle of evaporation of 5°, 10° and 15° as described by Bawa et. al. in Appl. Phys. Lett. Vol.57, p.1398 (1990). The alignment of ferroelectric liquid crystal molecules is in the plane of evaporation but tilted with respect to the substrates depending upon the thickness of $SiO_2$ to support the surface alignment. The display shows good bistability and is defect free. However, in this case the contrast is poor because of the high tilt angle of smectic layers (30°). Oblique deposition of $SiO_2$ has also been studied for different angles of evoparation as described by Ouchi et. al. in Jpn. J.Appl.Phys, Vol.27, L725 (1988) and L. A. Goodman, in IEEE. Trans. Electron Devices ED-24, 995 (1977) and has been extensively used with nematic liquid crystals. Substrates deposited at 60° angle with the normal, yield low (0°) pretilt surfaces as described by Y. Takanishi et.al; in Jpn. J. Appl. Phys; Vol. 28, L48 (1988).

Another known useful process in the state of the art is to align ferroelectric liquid crystal homogeneously, to rub unidirectionally the polyimide/polyamide treated transparent conducting plates as described by J. S. Patel et.al; in Ferroelectrics, Vol. 59, 137, (1984). Good alignment can be achieved by this technique over a large area. This method has been used to prepare the bistable devices as claimed by Yoshihara et al., in U.S. Pat. No. 5,568,299 and Tsuboyama et.al. in U.S. Pat. No. 05,013,137. However, the occurrence of zig-zag defects as described by M. A. Handschy and N. A. Clark; in Ferroelectrics, Vol. 59, 69 (1984) and line defects as described by Ishikawa et.al; in Jpn. J. Appl. Phys; Vol. 23, L 666 (1984) does not give rise to uniform contrast due to the presence of defect boundaries. Another drawback in this technique is that the charges are accumulated at the interface between the polymer and FLC material which destroys the bistability of the FLC device as described by Chieu and Yang, in Appl. Phys. Lett; Vol. 56, 1326 (1990).

Another known process in the state of art to get an uniform defect free sample is to post-treat the sample with AC field for a long time. The zig-zag type of defects which appears in a polyimide/polyamide treated rubbed glass plates can be removed by applying an alternating electric field of suitable frequency as detailed by S. S. Bawa et.al; in Jpn. J. Appl. Phys. Vol. 28, 662, (1989). The device can be obtained with large uniform area with good contrast and shows a bistability (memory effect) for few seconds. However, the long post-treatment timing makes the process to be a commercially non-viable one.

OBJECTS

The main object of the present invention is to provide a method for the preparation of a polymer coated long duration optical memory device having applications in ferroelectric liquid crystal materials which obviates the drawbacks of hitherto known processes as described in Table-1.

TABLE-1

| | Glass substrate | Coating of known composition (Polymer & Thickness) | Memory (ref.) |
|---|---|---|---|
| 1. | ITO coated glass substrate | 300 Å thick with polyamide (1,4-butylene terephthalate) | Bistable memory with few m.sec. memory Ref. APL, 47, 1278 (85) |
| 2. | ITO coated glass substrate | 600 Å Polyimide resin | AC stabilized effect memory Ref.JJAP, 27, 1115 (88) |
| 3. | ITO coated glass substrates | polyimide coating | AC stabilized memory Ref.JJAP, 33, 209 (94) |
| 4. | ITO coated glass substrates | Polyamide coating (Nylon 6/6 or 6/9) | few hours memory Ref.JJAP, 34, 3602 (95) Ferroelectrics, 211, 9 (98) |

Another object of the present invention is to provide a process for making an optical memory device having a high contrast display.

Still another object of the present invention is to provide an optical memory device having a microsecond switching time.

Yet another object of the invention is to provide a process for preparing an optical memory device using the homogeneous alignment of liquid crystal materials Another object of the present invention is to provide a process for preparing a memory device by deposition of thick polymer coating on glass substrates.

Yet another object of the present invention is to provide an optical memory device having a threshold voltage of depolarizing field of $5 \times 10^3$ kV/cm.

DETAILED DESCRIPTION

Accordingly the present invention provides a method for the preparation of a polymer coated long duration optical memory device having applications in ferroelectric liquid crystal materials, the said method comprises:

(a) cleaning a pair of optically flat ($\lambda$/10 flatness) glass plates;

(b) drying the cleaned glass plate;

(c) heating the dried glass plate to a temperature ranging between 100° C.–250° C. for a period ranging between 30 min. to 1 hr. in a vacuum chamber;

(d) coating the heated glass plates by depositing a thin film of indium tin oxide with a coating thickness in the range of 1000 Å to 2000 Å to obtain coated glass substrates with sheet resistance of at least 30–500 Q$\Omega$/□ and optical transmission of at least 85%;

e) cleaning the coated glass substrate obtained from step (d) above and forming patterns of different shapes and configurations by photolithographic methods to obtain an effective electrode area of at least 5 mm$^2$;

(f) cleaning the coated glass substrate from step (e) above followed by deposition of antireflection coating of external surfaces of glass substrates;

(g) cleaning the coated glass substrate from step (f) above followed by coating of the patterned glass substrate with a polymer selected from the group consisting of polyamide consisting of nylon 6/6 and nylon 6/9 in the thickness range of 900–1100 Å;

(h) baking the coated substrate obtained from the step (g) at a temperature ranging between 100° C. and 120° C. for a period ranging between 30 mins to 1 hr followed by hard rubbing of the polymer coated surface for number of rubbing steps in the range of 25 to 100, in the plane of the surface of the coated glass substrate;

(i) coating one of the substrates obtained from step (h) above with a spacer selected from photoresist, having a thickness in the range of 1 $\mu$m to 3 $\mu$m;

(j) inserting a ferroelectric liquid crystal material in the space available between the coated glass substrate from step (i) and glass substrate from step (h), followed by sealing the said sandwiched glass substrates at the periphery;

(k) heating the sandwiched glass substrates from step (j) above to a temperature in the range between 80° C. to 100° C. followed by cooling;

(l) fixing a polariser on non conducting surface of one of the glass substrates from step (k) above and an analyser on the non conducting surface of the other glass susbstrate;

(m) applying an AC field across device as obtained in step (l); and (n) applying a DC field across the device for a time period in the range of 30 secs. to 2 minutes after performing step (m) to obtain an optical memory device having a long duration of memory of at least one year.

In an embodiment of the present invention the cleaning of the glass substrate in step (a) above may be accomplished by chemical methods and ultrasonic agitation.

In another embodiment of the present invention the cleaned glass substrates may be dried in inert gas selected from nitrogen, argon.

In yet another embodiment of the present invention the glass substrates used may be selected from the group consisting of scratch, stress and void free and may be optically polished to the flatness of at least $\lambda$/4 per inch.

In still another embodiment the glass substrates used may be selected from the group consisting of fused Silica, Borosilicate material with low sodium ions and of 3–4 mm thickness to preserve the surface flatness.

In another embodiment the antireflection coatings may be multiple layers of SiO$_2$ and TiO$_2$ of a $\lambda$/4 thickness.

In still another embodiment the transparent conducting coating used in step (g) above may be selected from indium tin oxide, tin oxide.

In yet another embodiment the antireflection coatings may be prepared by known methods of thin film deposition in step (d) may be done such as by sputtering, reactive evaporation, electron beam evaporation or by sol-gel method.

In another embodiment the transparent conducting films may be prepared by known methods of thin film deposition done in step (d) selected from sputtering, reactive evaporation and electron beam evaporation.

In still another embodiment the transparent conducting glass substrate as obtained in step (e) may be dipped in silane solution and then dried.

In an embodiment the glass substrates may be coated with polymer selected from the group consisting of polyamide and polyimide by using known spinner technique.

In yet another embodiment the spacer used on any of the glass substrate may be a film of photoresist prepared by known photolithographic technique.

In still another embodiment sealing of the periphery of the two glass substrates to prepare the display in step (k) may be carried out by thermal setting the thermoplastic, or UV sealant.

In yet another embodiment the polariser and analyser in step (m) may be fixed by adhesives.

In still another embodiment the AC electric field applied may be in the range of 2–20V peak to peak.

In yet another embodiment the AC field may be applied at a temperature below the transition temperature of smectic C* to chiral nematic phase.

In another embodiment the DC field may be applied for a time in the range of 30 secs to 2 minutes.

In another embodiment optical memory device is characterised by a threshold voltage of $5\times10^3$ kV/cm.

The expression glass substrates and glass substrates have been used interchangeably.

The glass plates of required size are initially edge polished. Preferably the glass plates are borosilicate, fused silica, or of quartz. Glass plates are then roughly grounded by known techniques to desired thickness by emery powders and then finally polished to achieve optical flatness of at least $\lambda/4$ per inch using cerium oxide.

The glass plates are then cleaned to remove grease, dust etc. from their surfaces. Glass plates are initially boiled in chromic acid ($K_2Cr_2O_7+H_2SO_4+H_2O$) for 2–3 minutes and then cleaned in ultrasonic cleaner. Plates are then thoroughly cleaned sucessively in acetone, methanol and deionized water. Glass plates are then dried using filtered moisture free nitrogen gas.

The glass plates are then coated with a transparent conducting material under vacuum to form a thin layer of transparent conducting indium tin oxide, tin oxide, zinc oxide and the like. Glass plates are initially heated to 250° C. in vacuum. Initial pressure attained in vacuum chamber is $10^{-6}$ torr. Oxygen is introduced in the chamber to attain a pressure of about $2\times10^{-5}$ torr Indium oxide doped with about 3% metal tin is evaporated slowly by electron-beam gun to get deposited on hot glass plates. Oxygen in the chamber reacts with ongoing vapours to form a thin layer of indium tin oxide. The sheet resistance achieved in this case is in the range of 30 $\Omega/\square$ to about 500 $\Omega/\square$ with an optical transmission of more than 85% in the visible range.

The coated glass plates are cleaned again sequentially in soap solution, acetone, methanol and deionized water. The desired electrode pattern is formed by photolithographic and etching technique on the said glass plates. The glass substrates are spin coated initially with positive photoresist. Coated glass plates are prebaked at 80° C. for 10 minutes. Plates are then exposed to UV radiations for 1–4 minutes with the negative of electrode pattern on the photoresist. The portion which is to be retained should be transparent to light in the pattern. The exposed plates are then developed using dilute (1:3) Kodak photoresist developer for one minute. The glass substrates are then post-baked to harden the patterned photoresist. Plates are then etched to remove undesired ITO conducting film. Photoresist from the glass plates is then wiped off using acetone.

The glass substrates, having desired transparent conducting pattern are initially coated with an adhesion promoter, commercially available VM 651 (Dupont) or a silane solution treatment. For silane (0.5% solution of phenyl trichloro silane in toluene) treatment the glass substrates are dipped for 10 minutes and are rinsed in propanol. This procedure is immediately followed by deposition of the polyamide nylon solution. The nylon solution is prepared by taking a 1.0% (wt. to vol.) of nylon 6/6 or nylon 6/9 and dissolved in 60% m-cresol and 40% methanol (vol. to vol.). A thin layer of this solution is applied to the glass substrates by spinning. In this case, the spinning ratio and the concentration determines the thickness of the polymer coating and is therefore very critical. First sufficient solution is kept on the glass substrate in order to cover the entire sample. The sample is then spun at 4000 RPM for not more than one minute. The excess solvent is allowed to evaporate by heating the glass substrates in an oven at a temperature not exceeding 130° C. or a time period not more than one hour. Further, the polymer treated substrates are unidirectionally rubbed with a good quality velvet cloth. To achieve repeatability in the rubbed treatment, rubbing is done using a rubbing machine. In this machine, one can control the rubbing pressure as well as the number of rubbing strokes. The rubbing on the polymer coated glass substrates is obtained by means of a machine called screen printing machine. The distance between the rubbing block and the glass substrates is maintained by means of a head-screw. When the rubbing block just touches the glass substrates is termed as minimum rubbing and when head-screw completes one turn is taken as the maximum rubbing pressure.

The best bistable (memory) effect is observed when the thickness of the polymer coating is 900 to 1100 Å thick. When the thickness of the polymer is less than 900 Å the memory effect is lost or not observed. And if it is more than 1100 Å then the polymer coating is pealed off (removed) from the substrate at the time of rubbing, resulting into the disappearance of the alignment (non uniform contrast) in the displays. For achieving a good bistable (memory) device, based on FLC materials, a minimum distance (high rubbing pressure) is maintained between the rubbing block and the glass substrates. The main changes in the process steps as compared with the other known processes are firstly the thickness of the polymer coating is very thick (900–1100 Å) and secondly the rubbing strength on the polymer coated surface is relatively high. Because of these two conditions the surface area to accumulate the charges would be more.

Coating the polymer on one of the glass substrates and getting the uniform FLC alignment is not useful for all types of FLC materials. However, the contrast in one surface coated cells is very good (minimum defects). The Applicants have tested two FLC materials to get an alignment by treating one surface of the cell with polymer and rubbed.

After the alignment layer treatment by rubbing, the next step is to assemble the two glass plates to form a cell. The most important thing in this process is to obtain a uniform and accurate cell spacing. For this, on one of the glass substrates mylar spacers of known thicknesses are kept on the nonactive electrode area. The spacers are kept in such a way that there are two openings at the opposite sides to inject the liquid crystal material inside. Then the other glass plate is placed on to it so that the electrodes on them are properly matched to form an active display area. They are sealed together at the periphery, except the two openings, by Torr seal (Varian Associates, USA) or Araldite (CIBA, India).

However, achieving very thin samples (thickness of the order of 1–3 $\mu$m) is very difficult by mylar spacers. Therefore, before the polymer treatment of the glass substrates, a thin layer of negative photoresist material is photolithographically formed on one of the substrate to form the spacer. By controlling the thickness of the photoresist layer one can control the thickness of the cell prepared. The photoresist coated glass plates are then baked at 200–250° C. range for 30 minutes to make the photoresist coating hard. After this, the normal polymer coating and rubbing procedures are carried out and the cells are sealed. The cell thickness is measured by capacitance measurements or using optical interference method.

After the photoresist spacer and surface alignment coatings, the glass plates are assembled and sealed with a sealant and the ferroelectric liquid crystal material is filled in the cell. For this the liquid crystal material is placed near the small opening between the spacer and is filled by heating the sample to its isotropic phase. After the material has crept completely inside the cell, it is cooled slowly to ferroelectric liquid crystalline (Sm C*) phase. An electric field of 20 Vpp in frequency range of 50 Hz to 100 Hz is applied for one to two hours, just 1° C. below the transition temperature of Sm C* to Sm A or Sm C* to N* phases, to get an excellent alignment of FLC molecules for homogeneous alignment (uniform contrast).

The main hypothesis in the present invention is to create more charge accumulation in between polymer layer and the FLC material interface by the application of an electric field in the surface stabilized geometry. Once the applied field is removed and if the field due to charge accumulation (depolarizing field) is more than the threshold field, the FLC molecules should switch in the reverse direction. When the FLC molecules switch in the reverse direction, there is no opposing force which can change the direction of the molecules and should remain in the reverse direction (memory state) for very long time. The field due to charge accumulation is enhanced by depositing thick polymer (900–1100 Å) and strongly rubbing on the glass substrates, to provide more surface area for the accumulation of charges. In the cells where the thickness of the polymer is less than 900 Å and strongly rubbed the reverse memory effect is not observed, suggesting that the depolarizing field, created due to accumulation of charges is less than the threshold field, needed to switch the FLC molecules in reverse direction. If the thickness of the polymer is more than 1100 Å then the polymer coating is pealed off from the substrate at the time of rubbing.

In this invention to achieve the best charge stabilization (memory), a thick polymer (1000 Å) and thin FLC layer (2 $\mu$m) is better suited. During the application of an external field (+ve) the FLC molecules are in one of the uniform switched state (DOWN). The rotatory stage of the microscope was adjusted to achieve a dark state. After holding for 2 seconds–2 minutes (depending upon the amount of charges accumulated at the polymer surface) in this switched state, electric field is switched off and the field of view of the microscope turns bright. One can confirm that this state is indeed a reverse switched state (UP state) due to charge accumulation phenomenon, by the fact that when the sample is rotated by an angle 2θ ($\approx$45°) the field of view once again becomes dark. This charge stabilized UP state is highly stable and will remain in this state for months. This switched state acts like a monostable state but in reality it is not a true monostable state because of the fact that applying a field in the reverse direction (−ve) for another few seconds and switching off the field will bring back the sample to the DOWN state.

Thus, one can reliably obtain charge stabilized switched states by switching and holding the surface stabilized (SSFLC) structure in the opposite direction to the required state by applying an external field.

Filling hole is hermetically sealed with epoxy sealants. Analyser and polarizer are fixed on the two glass plates and the positions of the analyser and polarizer is adjusted such that they are crossed i.e. position of the polarizer is rotated by 90° with respect to the analyser. Electrical connections are taken out from the conducting portion of the electrodes for applying the electric field. The memory characteristics of the device of present invention are described in table-2

TABLE-2

Memory characteristics of the device of present invention

| | | | |
|---|---|---|---|
| 1. | ITO coated glass substrates | — 1000 A° Polyamide coating of Nylon 6/6, | — 14 months memory |

The process of the present invention is further illustrated by the following examples which should not however be construed to limit the scope of present invention.

EXAMPLE 1

Borosilicate glass substrates of size 3 cm×2 cm are taken and roughly edge grounded by using emery powder to get a smoothened edges. These ground glass plates were subsequently polished to get an optical flatness of λ/10 per inch by using cerium oxide powder. These polished glass plates are then cleaned thoroughly in $K_2 Cr_2O_7$, $H_2SO_4$, trichloroethylene and methanol with ultrasonic agitation and subsequently rinsed in deionised water and finally dried by using dry nitrogen gas. These cleaned glass plates are heated to a temperature of 250° C. and then coated with thin Indium tin oxide film by depositing a thin layer of indium oxide (ITO) doped with 3% tin in a vacuum deposition chamber by electron beam deposition. This process gives a sheet resistance of 100 Ω/□ and an optical transmission of 90%. These (ITO) coated glass substrates are again cleaned thoroughly in detergents and acetone and finally rinsed in deionised water and patterned by photolithography to get an effective electrode area of 1×1 sq. cm. The glass substrates patterned with ITO are again cleaned and dried as mentioned above. The films of $TiO_2/SiO_2$ is deposited as a antireflection coating with the total thickness of the film being kept at λ/4. The glass substrate coated with antireflection coating is again cleaned and dried and then nylon 6/6 polymer was spin coated on the conducting patterned surface of the substrate. The thickness of the nylon film was kept at 1000 Å. The nylon coated substrates were then baked at a temperature of 120° C. for 30 mins. The substrates after the nylon coating and hardening are rubbed by velvet cloth on the polymer surface. The rubbing is accomplished manually on a screen printing machine by effecting the rub for 50 times for a time period of 5 minutes and is done along the plane of the substrate. After the rubbing is completed, a photoresist is spin coated on one of the substrates to get a spacer of 2 $\mu$m thickness. The two glass plates are then brought in contact and properly matched with regard to the patterned ITO electrodes. There is a small gap in the spacer photeresist deposited on one of the substrates. The sandwich structure is then sealed on the two opposite sides by a vacuum sealant Torr Seal of Varian Associates after inserting the ferroelectric liquid crystal (FLC) material in the sandwich to complete the preparation of the making of the optical memory device. The FLC material ZLI-3654 (E.Merck, Germany) having a phase sequence of crystalline (−30° C.) smectic C*(62° C.) smectic A (76° C.) chiral nematic (86° C.) isotropic phase was then filled at its isotropic temperature in the gap between the two substrates. The final sealing is then done with the sealant and baked to effect the completion of the device fabrication. Now the optical memory device is ready for testing and use. This is achieved by fixing crossed polarizer on the two faces of the device and applying an electric field(Vpp=20 V at 80 Hz frequency) for two hours at room temperature for aligning the FLC material in the plane of the polymer coated substrate for getting the memory effect. The complete device is placed on the rotary table of an optical microscope and the sample so adjusted so as to get a dark state i.e. no light transmission through the sample. Next a field of 8 V dc was applied for 5 seconds. Immediately after removing the dc bias the field of view turned bright i.e. the sample became transparent. The sample is now rotated by 45° which yields dark field of view. This state remained stable for one year.

EXAMPLE 2

Borosilicate glass substrates of size 3 cm×2 cm are taken and roughly edge grounded by using emery powder to get a smoothened edges. These ground glass plates were subsequently polished to get an optical flatness of λ/10 per inch by using cerium oxide powder. These polished glass plates are then cleaned thoroughly in $K_2 Cr_2O_7$, $H_2SO_4$, trichloroethylene and methanol with ultrasonic agitation and subsequently rinsed in deionised water and finally dried by using pure nitrogen gas. These cleaned glass plates are heated to a temperature of 250° C. and then coated with thin Indium tin oxide film by depositing a thin layer of indium oxide (ITO) doped with 3% tin in a vacuum deposition chamber by electron beam deposition. This process gives a sheet resistance of 40 Ω/□ and an optical transmission of 85%. These (ITO) coated glass substrates are again cleaned thoroughly in detergents and acetone and finally rinsed in deionised water and patterned by photolithography to get an effective electrode area of 1×1 sq. cm. The glass substrates patterned with ITO are again cleaned and dried as mentioned above. The films of $TiO_2/SiO_2$ is deposited as a antireflection coating with the total thickness of the film being kept at λ/4. The glass substrate coated with antireflection coating is again cleaned and dried and then nylon 6/6 polymer was spin coated on the surface of the substrates without the antireflection coating. The thickness of the nylon film was kept at 900 Å. The nylon coated substrates were then baked at a temperature of 120° C. for 30 mins. The substrates after the nylon coating and hardening are rubbed by velvet cloth on the polymer surface. The rubbing is accomplished manually on a screen printing machine by effecting the rub for 50 times for a time period of about 5 minutes and is done along the plane of the substrate. After the rubbing is completed, a photoresist is spin coated on one of the substrates to get a spacer of 2 μm thickness. The two glass plates are then brought in contact and properly matched with regard to the patterned ITO electrodes. There is a small gap in the spacer photoresist deposited on one of the substrates. The sandwich structure is then sealed on the two opposite sides by a vacuum sealant Torr Seal of Varian Associates after inserting the ferroelectric liquid crystal (FLC) material in the sandwich to complete the preparation of the making of the memory device. The FLC material CS 2004 (Chisso Corpn. Japan) having a phase sequence of crystalline (9° C.) smectic C*(62° C.) chiral nematic (71° C.) isotropic phase was filled at its isotropic temperature in the gap between the two substrate. The final sealing is then done with the sealant and baked to effect the completion of the device fabrication. Now the optical memory device is ready for testing and use. This is achieved by fixing crossed polarizers on the two faces of the device and applying an electric field(Vpp=20 V at 80 Hz frequency) for one hour just 1° C. below the transition temperature of smectic C* to chiral nematic phase. The complete device is placed on the rotary table of an optical microscope and the sample so adjusted so as to get a dark state i.e. no light transmission through the sample. Next a field of 8 V DC was applied for 2 minutes. Immediately after removing the DC bias the field of view again turns dark. i.e. the sample became opaque. The sample is now rotated by 90° which yields again dark field of view as the tilt angle of the FLC material is rotated by 90° due to depolarizing field. This state remained stable for one year.

EXAMPLE-3

Borosilicate glass substrates of size 3 cm×2 cm are taken and roughly edge grounded by using emery powder to get a smoothened edges. These ground glass plates were subsequently polished to get an optical flatness of λ/10 per inch by using cerium oxide powder. These polished glass plates are then cleaned thoroughly in $K_2 Cr_2O_7$, $H_2SO_4$, trichloroethylene and methanol with ultrasonic agitation and subsequently rinsed in deionised water and finally dried by using dry nitrogen gas. These cleaned glass plates are heated to a temperature of 250° C. and then coated with thin Indium tin oxide film by depositing a thin layer of indium oxide (ITO) doped with 3% tin in a vacuum deposition chamber by electron beam deposition. This process gives a sheet resistance of 40 Ω/□ and an optical transmission of 85%. These (ITO) coated glass substrates are again cleaned thoroughly in detergents and acetone and finally rinsed in deionised water and patterned by photolithography to get an effective electrode area of 1×1 sq. cm. The glass substrates patterned with ITO are again cleaned and dried as mentioned above. These patterned substrates are then coated with thin film of $SiO_2$ deposited by e-beam, with the substrates held at room temperature, with the thickness of the film being kept at λ/4. The film of $SiO_2$ is deposited as a antireflection coating. The glass substrate coated with antireflection coating is again cleaned and dried and then nylon 6/6 polymer was spin coated on the surface of the substrates without the antireflection coating. The thickness of the nylon film was kept at 900 Å. The nylon coated substrates were then baked at a temperature of 120° C. for 30 mins. The substrates after the nylon coating and hardening are rubbed by velvet cloth on the polymer surface. The rubbing is accomplished manually on a screen printing machine by effecting the rub for 50 times for a time period of about 5 minutes and is done along the plane of the substrate. After the rubbing is complete, a photoresist is spin coated on one of the substrates to get a spacer of 2 μm thickness. The two glass plates are then brought in contact and properly matched with regard to the patterned ITO electrodes. There is a small gap in the spacer photoresist deposited on one of the substrates. The sandwich structure is then sealed on the two opposite sides by a vacuum sealant Torr Seal of Varian Associates after inserting the ferroelectric liquid crystal (FLC) material in the sandwich to complete the preparation of the making of the memory device. The FLC material ZLI-3654 (E.Merck, Germany) having a phase sequence of crystalline—smectic C*—smectic A—chiral nematic—isotropic phase was then filled at its isotropic temperature in the gap between the two substrates. The final sealing is then done with the sealant and baked to effect the completion of the device fabrication. Now the optical memory device is ready for testing and use. This is achieved by fixing crossed polarizers on the two faces of the device and applying an electric field (Vpp=20 V at 80 Hz frequency) for two hours at room temperature of smectic C* to chiral nematic phase.

The complete device is placed on the rotary table of an optical microscope and the sample so adjusted so as to get a dark state i.e. no light transmission through the sample. Next a field of 8 V DC was applied for 30 seconds. Immediately after removing the dc bias the field of view turned bright i.e. the sample became transparent. The sample is now rotated by 45° which yields dark field of view. This state remained stable for 16 months.

EXAMPLE-4

Borosilicate glass substrates of size 3 cm×2 cm are taken and roughly edge grounded by using emery powder to get a smoothened edges. These ground glass plates were subsequently polished to get an optical flatness of $\lambda/10$ per inch by using cerium oxide powder. These polished glass plates are then cleaned thoroughly in $K_2Cr_2O_7$, $H_2SO_4$, trichloroethylene and methanol and ultrasonic agitation and subsequently rinsed in deionised water and finally dried by using dry nitrogen gas. These cleaned glass plates are heated to a temperature of 250° C. and then coated with thin Indium tin oxide film by depositing a thin layer of indium oxide (ITO) doped with 3% tin in a vacuum deposition chamber by electron beam deposition. This process gives a sheet resistance of 40 $\Omega/\square$ and an optical transmission of 85%. These (ITO) coated glass substrates are again cleaned thoroughly in detergents and acetone and finally rinsed in deionised water and patterned by photolithography to get an effective electrode area of 1×1 sq. cm. The glass substrates patterned with ITO are again cleaned and dried as mentioned above. These patterned substrates are then coated with thin film of $SiO_2$ deposited by e-beam, with the substrates held at room temperature, with the thickness of the film being kept at $\lambda/4$. The film of $SiO_2$ is deposited as a antireflection coating. The glass substrate coated with antireflection coating is again cleaned and dried and then nylon 6/6 polymer was spin coated on the surface of the substrates without the antireflection coating. The thickness of the nylon film was kept at 1100 Å. The nylon coated substrates were then baked at a temperature of 120° C. for 30 mins. The substrates after the nylon coating and hardening are rubbed by velvet cloth on the polymer surface. The rubbing is accomplished manually on a screen printing machine by effecting the rub for 50 times for a time period of about 5 minutes and is done along the plane of the substrate. After the rubbing is complete, a photoresist is spin coated on one of the substrates to get a spacer of 2 $\mu$m thickness. The two glass plates are then brought in contact and properly matched with regard to the patterned ITO electrodes. There is a small gap in the spacer photeresist deposited on one of the substrates. The sandwich structure is then sealed on the two opposite sides by a vacuum sealant Torr Seal of Varian Associates after inserting the ferroelectric liquid crystal (FLC) material in the sandwich to complete the preparation of the making of the memory device. The FLC material ZLI-3654 (E.Merck, Germany) having a phase sequence of crystalline—smectic C*—smectic A—chiral nematic—isotropic phase was then filled at its isotropic temperature in the gap between the two substrates. The final sealing is then done with the sealant and baked to effect the completion of the device fabrication. Now the optical memory device is ready for testing and use. This is achieved by fixing polarizers on the two faces of the device and applying an electric field(Vpp=20 V at 80 Hz frequency) for two hours at room temperature.

The complete device is placed on the rotary table of an optical microscope and the sample so adjusted so as to get a dark state i.e. no light transmission through the sample. Next a field of 8 V DC was applied for 5 seconds. Immediately after removing the dc bias the field of view turned bright i.e. the sample became transparent. The sample is now rotated by 45° which yields dark field of view. This state remained stable for 16 months.

The different parameters in this invention for a FLC memory device is given in the Table-3.

TABLE-3

Characterization of the invented device

| | Polymer thickness | Stabilization time to Accummulate charges | Memory time |
|---|---|---|---|
| 1. | 900 A° | 2 minutes | One year |
| 2. | 1000 A° | 30 seconds | One year |
| 3. | 1100 A° | 2 seconds | One year |
| 4. | 1150 A° | No alignment | No memory |

The main advantages of the present invention are,

1. The polymer coating parameters for the alignment of FLC materials are less critical and can be easily controlled and prepared in short time.
2. Polymer coating over large area of the sample is easy. Therefore, large area display devices can be prepared by this invention. Thickness of the polymer film is not critical and so mass production is very convenient.
3. Large scale commercially viable production can easily be carried out.
4. The device prepared by the process of the present invention can be easily incorporated in an optical computing device.

Possible applications of the FLC memory devices:

The invented optical memory effect, based on ferroelectric liquid crystal can be used in information processing devices. One of the most important devices for optical processing is the optically addressed spatial light modulators (OASLM). These devices provide logic and memory functions which would be used to implement flexible processing. Such devices find lot of applications in space.

The FLC-spatial light modulators has a sandwich structure consisting of a photoconductor, a dielectric mirror and an FLC. The FLC layer modulates the polarization of the read beam coming through a polarization beam splitter. The FLC-SLM thus processes and stores a positive image for negative electric pulse and a negative image for positive pulse. The stored image can be read out at any time.

The novelty in the present invention for optically addressed spatial light modulators is that the alignment of FLC molecules can be obtained by treating one substrate of the cell so that the photoconductor side of the SLM is not affected. Some of the applications of the OASLM based on FLC, are described briefly below;

1. Projection display: An important application for high-resolution projection display is image amplification. A weak image such as from small CRT, which writes on the photosensor is amplified using a bright read beam reflector through the modulator and projected onto a screen.
2. Image wave length converters: Infrared-to-visible and visible to infrared image conversion are two other tasks for which OASLM are the appropriate transducer. With a visible write light and an infrared read light an OASLM can be used to stimulate an infrared image for testing infrared detection systems. The usable write-light input wave length range of OASLMs for infrared to visible conversion depends mainly upon the spectral response of the photosensor.

3. Optical correlation: Some optical pattern recognition systems require OASLMs. In a correlator, an input scence is correlated with a reference. In a Vander-Lugt correlator, the reference is in the form of a Fourier transform hologram or matched filter. The OASLM is used as an incoherent-to-coherent image transducer at the input. A Fourier transform of the input scence is then formed at the back focal plane of a lens. Multiplication between the transform of the input scence and the matched filter produces the correlation. In a joint transform correlator the Fourier transforms of both the input scence and the reference are interfered on an OASLM.

What is claimed is:

1. A method for the preparation of a polymer coated long duration optical memory device having applications in ferroelectric liquid crystal materials, the said method comprises:

(a) cleaning a pair of optically flat ($\lambda$/10 flatness) glass plates;

(b) drying the cleaned glass plate;

(c) heating the cleaned and dried glass plate to a temperature ranging between 100° C.–250° C. for a period ranging between 30 min. to 1 hr. in vacuum unit;

(d) coating the heated glass plates by depositing a thin film of indium tin oxide with a coating thickness in the range of 1000 Å to 2000 Å to obtain coated glass substrates with sheet resistance of at least 10 $\Omega/\square$ and optical transmission of at least 85%;

(e) cleaning the coated glass substrate followed by forming patterns of different shapes and configurations by lithographic methods to obtain an effective electrode area of at least 5 mm$^2$;

(f) cleaning the coated glass substrate from step (e) above followed by deposition of antireflection coating on external surfaces of glass substrates (g) Cleaning the coated glass substrate from step (f) above followed by coating of the patterned glass substrate with a polymer selected from the polyamide group of nylon 6/6 and nylon 6/9 in the thickness range of 900 Å–1100 Å;

(h) baking the coated substrate obtained from the step (f) at a temperature ranging between 100° C. and 120° C. for a period ranging between 30 mins to 1 hr followed by hard rubbing of the polymer coated surface for number of rubbing steps in the range of 25 to 100, in the desired direction of the surface of the coated glass substrate;

(i) coating one of the substrates obtained from step (g) above with a spacer selected from photoresist, having a thickness in the range of 1 $\mu$m to 3 $\mu$m;

(j) inserting a ferroelectric liquid crystal material in the space available between the coated glass substrate from step (i) and glass substrate from step (h), followed by sealing the said sandwiched glass substrates at the periphery;

(k) heating the sandwich glass plates from step (j) above to a temperature in the range between 80° C. to 100° C. followed by cooling;

(l) fixing a polariser on non conducting surface of one of the glass plates from step (k) above and an analyser on the non conducting surface of the other glass substrate followed by application of electric field across the sandwiched substrates in the said glass substrates for achieving the stable memory action;

(m) applying an AC field across device as obtained in step (l); and (n) applying a DC field across the device for a time period in the range of 30 secs. to 2 minutes after performing step (m) to obtain an optical memory device having a long duration of memory of at least one year.

2. A method as claimed in claim 1 wherein the cleaning of the glass substrate in step (a) above is accomplished by chemical methods and ultrasonic agitation.

3. A method as claimed in claim 1 wherein the cleaned glass substrates are dried in inert gas selected from nitrogen and argon.

4. A method as claimed in claim 1 wherein the glass substrates used are selected from the group consisting of scratch, stress and void free and are optically polished to the flatness of at least $\lambda$/4 per inch.

5. A method as claimed in claim 1 wherein the glass substrates used are selected from the group consisting of fused Silica, Borosilicate material with low sodium ions and of 3–4 mm thickness to preserve the surface flatness.

6. A method as claimed in claim 1 wherein the antireflection coatings done in step (g) selected from multilayers of $TiO_2$ and $SiO_2$ of $\lambda$/4 thickness.

7. A method as claimed in claim 1 wherein the transparent conducting coating used in step (g) above is selected from indium tin oxide, tin oxide, and zinc oxide.

8. A method as claimed in claim 1 wherein the antireflection coatings are prepared by known methods of thin film deposition in step (d) is done by thermal evaporation, electron beam evaporation and by sol-gel technique.

9. A method as claimed in claim 1 wherein the transparent conducting films are prepared by known methods of thin film deposition in step (d) is done by sputtering, reactive evaporation and electron beam evaporation.

10. A method as claimed in claim 1 wherein the transparent conducting substrates as obtained in step (d) are dipped in silane solution and then dried.

11. A method as claimed in claim 1 wherein the glass substrates are coated with polymer selected from the group consisting of polyamide and polyimide by using a spinner technique.

12. A method as claimed in claim 1 wherein, the spacer used on any of the glass substrate is a film of photoresist prepared by photolithographic technique.

13. A method as claimed in claim 1 wherein, sealing of the periphery of the two glass substrates to prepare the display in step (j) is carried out by thermal setting a thermoplastic or UV sealant.

14. A method as claimed in claim 1 wherein the polariser and analyser in step (l) are crossed fixed by adhesives.

15. A method as claimed in claim 1 wherein the applied AC voltage is in the range of in the range of 2–20V peak to peak.

16. A method as claimed in claim 1 wherein the AC field is applied at a temperature below the transition temperature of smectic C* to chiral nematic phase.

17. A method as claimed in claim 1 wherein the DC field is applied for a time in the range of 30 secs to 2 minutes.

18. A method as claimed in claim 1 wherein the AC field may be applied at a temperature below the transition temperature of smectic C* to chiral nematic phase.

19. A method as claimed in claim 1 wherein the DC field may be applied for a time in the range of 30 secs to 2 minutes.

20. A polymer coated long duration optical memory device having applications in ferroelectric liquid crystal materials prepared by the method as claimed in any one of claims 1–19.

21. A device as claimed in claim 20 wherein the optical memory device is characterised by a threshold voltage of $5 \times 10^3$ kV/cm.

* * * * *